United States Patent [19]
Kann

[11] Patent Number: 5,827,011
[45] Date of Patent: Oct. 27, 1998

[54] WAVE SUPPRESSION SYSTEM

[76] Inventor: Dirk C. Kann, 531-1/2 S. River Park Dr., Guttenberg, Iowa 52052

[21] Appl. No.: 779,987

[22] Filed: Dec. 23, 1996

[51] Int. Cl.$^6$ .................................. E02B 3/06; E02B 3/04
[52] U.S. Cl. ................................................. 405/27; 405/26
[58] Field of Search .................................. 405/25–27, 21, 405/211–215, 218–221

[56] References Cited

U.S. PATENT DOCUMENTS

| | | | |
|---|---|---|---|
| 151,858 | 6/1874 | Dean | 405/27 |
| 2,044,795 | 6/1936 | Knight | 405/27 X |
| 3,444,693 | 5/1969 | Busey . | |
| 3,848,419 | 11/1974 | Bowley | 405/26 |
| 3,877,233 | 4/1975 | Olsen | 405/27 |
| 3,991,576 | 11/1976 | Tazaki et al. . | |
| 4,048,802 | 9/1977 | Bowley . | |
| 4,264,233 | 4/1981 | McCambridge | 405/26 |
| 4,407,607 | 10/1983 | McCambridge | 405/26 |
| 4,431,337 | 2/1984 | Iwasa . | |
| 4,712,944 | 12/1987 | Rose . | |
| 4,715,744 | 12/1987 | Richey | 405/26 |
| 4,764,052 | 8/1988 | Jarlan . | |
| 4,997,310 | 3/1991 | Rasmussen . | |
| 5,238,325 | 8/1993 | Krenzler . | |
| 5,242,243 | 9/1993 | Bachelier . | |
| 5,304,005 | 4/1994 | Loeffler-Lenz . | |

FOREIGN PATENT DOCUMENTS

| | | | |
|---|---|---|---|
| 57-146809 | 9/1982 | Japan . | |
| 63-304812 | 12/1988 | Japan . | |
| 63-312409 | 12/1988 | Japan . | |
| 117908 | 1/1989 | Japan . | |
| 0136413 | 5/1990 | Japan | 405/26 |
| 6-2316 | 1/1994 | Japan . | |
| 6-108433 | 4/1994 | Japan . | |
| 6-185034 | 7/1994 | Japan . | |
| 1015 | 3/1875 | United Kingdom | 405/27 |
| 607115 | 8/1948 | United Kingdom | 405/27 |
| 1373035 | 11/1994 | United Kingdom . | |

*Primary Examiner*—Dennis L. Taylor
*Attorney, Agent, or Firm*—Foley & Lardner

[57] ABSTRACT

A wave suppression member for suppressing waves along a water surface includes a hollow cylinder having a top defining an opening and a sidewall extending from the top. The sidewall includes a plurality of perforations extending through the sidewall. A flotation member is coupled to the top of the barrel for buoyantly supporting the top of the barrel at the water surface.

20 Claims, 3 Drawing Sheets

5,827,011

WAVE SUPPRESSION SYSTEM

BACKGROUND OF THE INVENTION

The present invention relates to wave suppression systems for squelching natural and man-made waves in marine areas. In particular, the present invention relates to a wave suppression system formed from a plurality of wave suppression members having perforated sidewalls and an open upper end buoyantly supported at the water surface.

Natural and man-made waves along waterways and bodies of water cause extremely large amounts of damage to marinas and shorelines worldwide. For example, waves erode and destroy valuable shoreline. In addition, natural and man-made waves cause boats and other marine vessels to rock. As a result, the rocking causes the boats and marine vessels to rub and wear against the docks and the mooring supports.

To protect shorelines and marine areas such as docks, numerous break water systems have been developed including marine bed caissons and floating barriers. Marine bed caissons are typically mounted or fixed along the floor or bed of a waterway or body of water in which wave dissipation is desired. In contrast, floating barriers are buoyantly supported along the water surface. Typical floating barriers include a single or a plurality of generally closed, hollow floating members which are strung together to form the floating wave barrier. Alternatively, floating wave barriers may include a vertical panel that is horizontally slotted or a horizontally extending honeycombed structure having a plurality of water-imprisoning pockets.

Each of the aforementioned break water systems is extremely costly and difficult to set up and maintain or is severely limited in application. For example, marine bed caissons must be mounted or fixed along the floor or bed of the waterway or body of water. As a result, marine bed caissons are limited to relatively shallow marine areas. Furthermore, their cost is conspicuous due to their sometimes immense size.

Floating wave barriers are also extremely expensive, extremely complicated, and many times ineffective. For example, floating barriers consisting solely of hollow floating members have a limited mass and inertia. Consequently, the hollow floating members provide limited resistance to the oncoming wave and are ineffective. Floating wave barriers having honeycombed structures or slotted panels are complicated, difficult to manufacture, difficult to deploy and expensive to maintain. None of the aforementioned break water systems provide a simple, cost effective system for dissipating natural and man-made waves.

SUMMARY OF THE INVENTION

The present invention is an improved wave suppression system for suppressing waves along a water surface. The system includes a plurality of wave suppression members coupled together along the water surface. Each member includes a hollow cylinder having a top defining an opening and a sidewall extending from the top. The sidewall includes a plurality of perforations extending through the sidewall. A flotation member is coupled to the top of the barrel for buoyantly supporting the top of the barrel at the water surface. In a preferred embodiment, each wave suppression member includes a wave deflection panel having a vertical surface extending above the opening and a stabilizing attachment coupled to the cylinder for stabilizing the cylinder while the cylinder encounters waves. In a preferred embodiment, the cylinder includes a bottom which supports and contains a ballast. To enable the wave suppression member to be effective independent of orientation, the preferred flotation member includes a float ring encircling the opening of the top. In addition, both the wave deflection panel and the stabilizing attachment include perpendicular vertical surfaces.

DETAILED DESCRIPTION OF THE PREFERRED EMBODIMENTS

Figure 1:
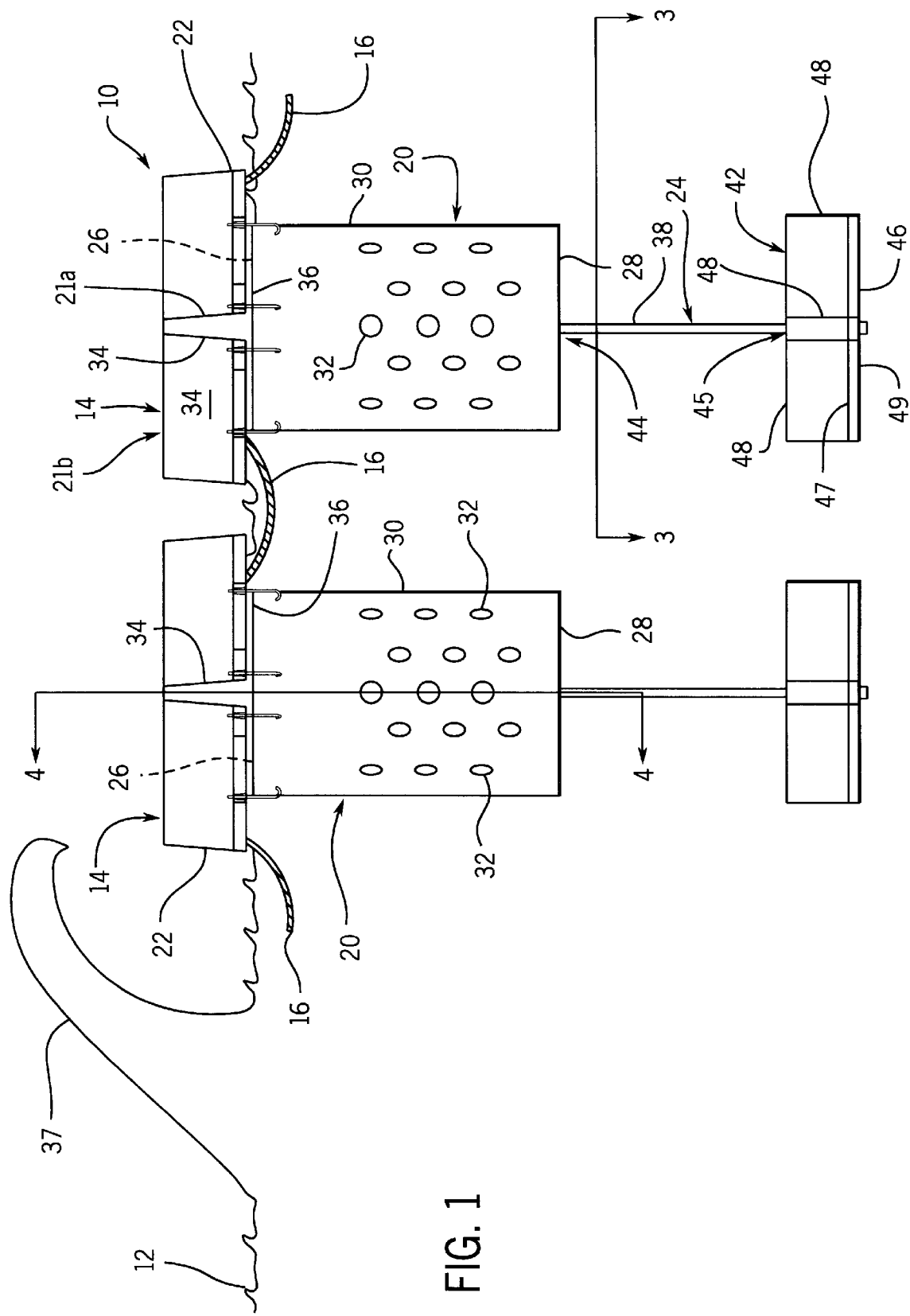
FIG. 1 is a side elevational view of a wave suppression system including a plurality of wave suppression members coupled together along a water surface.

FIG. 1 is a side elevational view of a wave suppression system 10 for suppressing waves along a water surface 12. Wave suppression system 10 generally includes a plurality of wave suppression members 14 strung together by coupling mechanism 16. Wave suppression member 14 generally includes barrel 20, wave deflection panels 21a, 21b, flotation member 22 and stabilizing attachment 24. Barrel 20 preferably comprises an elongate hollow cylinder having a top 26, a bottom 28 and at least one sidewall 30 extending between top 26 and bottom 28. In the preferred embodiment illustrated, barrel 20 has a diameter of about 36 inches. In the preferred embodiment illustrated, barrel 20 has a circular cross-section and is cylindrical in shape. Alternatively, barrel 20 may have any of a number of cross-sectional shapes and may include a plurality of sidewalls 30. For example, barrel 20 may alternatively have a rectangular, hexagonal or octagonal cross-sectional shape along its length between top 26 and bottom 28. Barrel 20 is preferably made from a non-corrosive material, preferably plastic or metal.

Top 26 defines an opening 36 supported at the water surface 12 in communication with the interior of barrel 20. Because opening 36 of top 26 is positioned at the water surface 12, water does not normally enter into barrel 20 through opening 36. However, opening 36 opens upward so that turbulent water, such as wave 37, rising above water surface 12 will swell or crash over and onto barrel 20 so that water of wave 37 passes through opening 36 into the interior of barrel 20. Opening 36 extends through top 26 of barrel 20 and preferably has a diameter large enough so as to capture most of the water of wave 37. Preferably, opening 36 of top 26 has a diameter of about 36 inches or the size of a readily available drum.

Bottom 28 of barrel 20 extends opposite top 26 and opening 36 between sidewall 30. Bottom 28 is preferably imperforate for supporting and containing a ballast 70 (shown in FIG. 3). Bottom 28 further supports stabilizing attachment 24. Alternatively, bottom 28 may be omitted from barrel 20 when neither ballast 70 nor stabilizing attachment 24 are required. Bottom 28 may also be omitted when ballast 70 and stabilizing attachment 24 are alternatively supported by flotation member 22 or an alternative structure coupled to barrel 20.

As shown by FIG. 1, sidewall 30 extends generally vertically between top 26 and bottom 28 and defines a plurality of perforations 32 extending therethrough. Perforations 32 extend through one or more sides of barrel 20 so as to provide communication between an interior of barrel 20 and an exterior of barrel 20. Perforations 32 preferably extend through opposing sides of sidewall 30 in directions generally perpendicular to the anticipated direction of the oncoming wave or wake and generally parallel to the shoreline or marina that is to be protected from the waves. Because perforations 32 preferably extend at least through opposite sides of sidewall 30 in directions generally perpendicular to the anticipated direction of the oncoming waves, perforations 32 effectively diffuse and dissipate the energy of the wave with minimal tipping of barrel 20.

In the preferred embodiment illustrated, perforations 32 extend through all sides of barrel 20. Because perforations 32 extend through all sides of barrel 20, wave suppression member 14 effectively diffuses the water of the wave to effectively dissipate the energy of the wave independent of the orientation of wave suppression member 14 relative to the oncoming wave. Consequently, wave suppression member 14 does not require means for fixedly mounting or securing wave suppression member 14 in a fixed orientation as with conventional marine bed caissons which must be fixed in a specific orientation by being fixed along the floor or bed of the waterway or body of water. Perforations 32 are preferably adequately sized for enabling water to diffuse from the interior of barrel 20 through perforations 32. In the preferred embodiment illustrated, perforations 32 have a diameter of approximately two inches.

Figure 3:
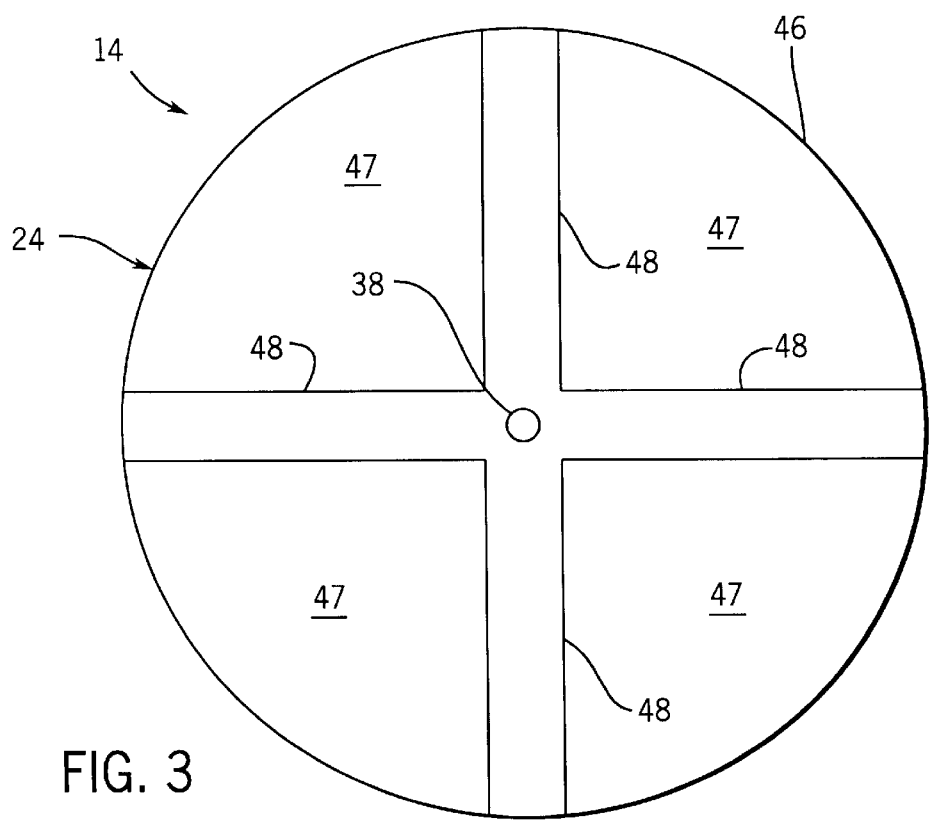
FIG. 3 is a sectional view of the wave suppression member of FIG. 1 taken along lines 3—3.

As best shown by FIGS. 1 and 3, wave deflection panels 21a, 21b are elongate flat panels having generally vertical surfaces 34. Wave deflection panels 21a, 21b are coupled to barrel 20 across opening 36 above water surface 12. Surfaces 34 extend above opening 36 and above water surface 12 by a distance sufficient for impeding wave 37 to direct and channel the water of wave 37 through opening 36 into barrel 20. Wave deflection panels 21a, 21b deflect water from wave 37 vertically into barrel 20 through opening 36 and prevent wave 37 from merely flowing over wave suppression member 14. At the same time, panels 21a, 21b have a thickness dimensioned so as to minimize interference with water entering through opening 36 into an interior of barrel 20. In the preferred embodiment illustrated, wave deflection panels 21a, 21b are integrally formed as a single unitary body. In the preferred embodiment illustrated, wave deflection panels 21a, 21b are also integrally formed as part of a single unitary body with flotation member 22 which is coupled to barrel 20.

In the preferred embodiment illustrated, surfaces 34 of wave deflection panels 21a, 21b extend above opening 36 and above water surface 12 by approximately one foot. As can be appreciated, the exact vertical height of surface 34 of wave deflection panels 21a, 21b may vary depending upon the anticipated height of wave 37. Surfaces 34 of wave deflection panels 21a, 21b preferably extend above opening 36 in a horizontal direction perpendicular to the anticipated direction of wave 37 towards wave suppression member 14.

In the preferred embodiment illustrated, each wave suppression member 14 includes two wave deflection panels 21a, 21b supported 180° relative to one another above opening 36. Preferably, wave deflection panels 21a, 21b intersect one another above opening 36 so as to have an X-shape cross-section. Because panels 21a, 21b have an X-shaped configuration and are fixedly coupled to flotation member 22 above opening 36, panels 21a, 21b also brace sides of barrel 20 to provide additional flotation and structure to barrel 20 and flotation member 22. Moreover, because wave deflection panels 21a, 21b are supported above opening 36 at approximately 180° relative to one another, waves are deflected by surfaces 34 into barrel 20 through opening 36 independent of the orientation of barrel 20 relative to an oncoming wave. Consequently, wave suppression members 14 do not require means for fixing mounting and securing waves suppression member 14 in any fixed orientation. Although wave suppression member 14 is illustrated as including two wave deflection panels 21a, 21b above opening 36 of barrel 20, wave suppression member 14 may alternatively include a single wave deflection panel or multiple wave deflection panels extending above opening 36 at different angles relative to one another or parallel to one another.

Flotation member 22 buoyantly supports top 26 of barrel 20 at or slightly above the water surface 12. Preferably, flotation member 22 maintains top 26 at the water surface 12 at a height such that wave 37 crashes over and onto top 26 so that the water of the wave 37 passes through opening 36 into barrel 20. Flotation member 22 preferably comprises a hollow and closed body coupled to top 26 of barrel 20. Alternatively, flotation member 22 may have a variety of structures and be made of a variety of different materials which provide buoyancy in water. Furthermore, flotation member 22 may alternatively comprise multiple individual flotation members coupled to barrel 20 for buoyantly supporting top 26 above water surface 12. Because flotation member 22 buoyantly supports top 26 of barrel 20 at or slightly above water surface 12, a majority of barrel 20 extends below water surface 12. As a result, a majority of barrel 12 is filled with water. The water within barrel 12 provides significant mass and increases the moment of inertia of wave suppression member 14 to resist motion when encountering waves. As a result, wave suppression member 14 does not need to be secured or fixed along the floor bed of a water wave or body of water for resisting motion of a wave.

As best shown by FIGS. 1 and 3, stabilizing attachment 24 is fixedly coupled to barrel 20 and extends downward from barrel 20 to stabilize wave suppression member 14. Stabilizing attachment 24 includes connector 38 and stabilizer 42. Connector 38 has a first end 44 coupled to barrel 20 and a second end 45 connected to stabilizer 42 to couple stabilizer 42 to barrel 20. In the preferred embodiment illustrated, connector 38 is a rigid rod. End 44 of connector 38 extends through bottom 28 and is coupled to bottom 28 by a nut and washer arrangement (shown in FIG. 4). End 45 of connector 38 is similarly secured to stabilizer 42 by a nut and washer arrangement (shown in FIG. 1). In addition to coupling stabilizer 42 to barrel 20, connector 38 also spaces stabilizer 42 from barrel 20 to enable stabilizer 42 to better stabilize wave suppression member 14.

Stabilizer 42 is secured to second end 45 of connector 38 and includes disk 46 and blades 48. Disk 46 is a generally flat horizontal plate coupled to end 45 of connector 38 below barrel 20. Disk 46 has upper and lower surfaces 47, 49 having surface areas sufficiently sized for resisting abrupt vertical movement. As a result, disk 46 stabilizes wave suppression member 14 against upward and downward movement when wave suppression member 14 encounters a wave.

Blades 48 are generally flat vertical panels coupled to connector 38 below barrel 20. In the preferred embodiment illustrated, stabilizer 42 includes four blades 48 radially extending from a center line of connector 38 approximately 90° relative to one another. Because blades 48 have surfaces which extend in a general vertical direction, blades 48 resist any horizontal movement of stabilizer 42. Because blades 48 are angularly spaced approximately 90° with respect to one another, blades 48 resist horizontal movement in virtually all directions. In the preferred embodiment, blades 48 are integrally formed as part of a unitary body with disk 46. Because disk 46 and blades 48 of stabilizer 42 are preferably rigidly coupled to barrel 20 by connector 38, disk 46 and blades 48 also resist vertical and horizontal movement of barrel 20, wave deflection panels 21a, 21b and flotation member 22. Thus, stabilizing attachment 24 inhibits or prevents wave suppression member 14 from tipping or rolling when encountering a wave to enable wave suppression member 14 to better dissipate energy from the wave. Although stabilizing attachment 24 is illustrated as a flat disk having four vertically extending blades, stabilizing attachment 24 may have alternative shapes and configurations having horizontal and vertical surfaces with sufficient areas for stabilizing wave suppression member 14.

Coupling mechanism 16 joins and interconnects wave suppression members 14 to one another along water surface 12. Coupling mechanism 16 further couples wave suppression members 14 to a fixed mounting point on shore or in the water to prevent excessive drifting of wave suppression members 14. In the preferred embodiment illustrated, coupling mechanism 16 comprises a rope tied about and in between each wave suppression member 14 and between terminal wave suppression members 14 and the fixed mounting point (not shown).

Figure 2:
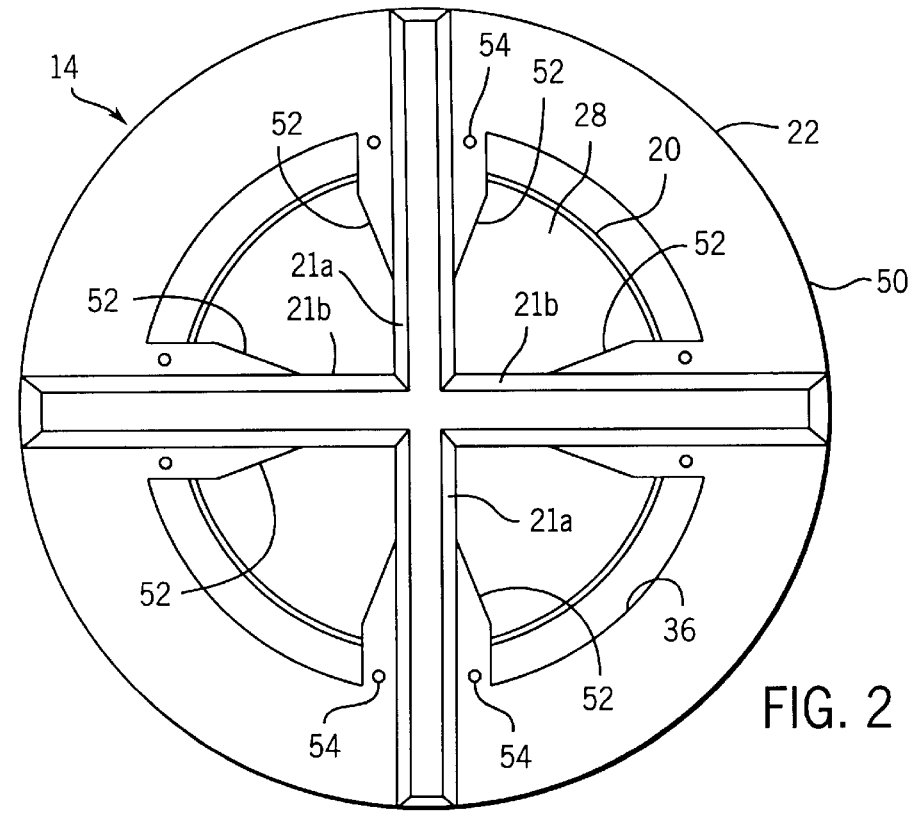
FIG. 2 is a top elevational view of a wave suppression member.

As shown by FIG. 2, flotation member 22 preferably includes float ring 50 and flanges 52. Float ring 50 is a generally annular shaped flotation collar encircling top end of wall 30 (shown in FIG. 1) adjacent to opening 36. In the preferred embodiment, float ring 50 comprises an annular hollow plastic sealed ring coupled about sidewall 30 and adjacent to top 26 of barrel 20 to buoyantly support top 26 at the water surface. Alternatively, float ring 50 may be made from a variety of flotation materials and structures such as plastic, foam, wood or a combination thereof. In the preferred embodiment, float ring 50 is preferably coupled to barrel 20 by flanges 52 and fasteners 54. Alternatively, float ring 50 may be directly fixedly coupled to barrel 20 by various well known attachment means.

Flanges 52 are fixedly coupled to float ring 50 and extend inward from float ring 50 adjacent panels 21a, 21b. Flanges 52 are preferably integrally formed with float ring 50 and panels 21a, 21b. Flanges 52 are rigid so as to support fasteners 54 which coupled barrel 22 float ring 50 and panels 21a, 21b.

Figure 4:
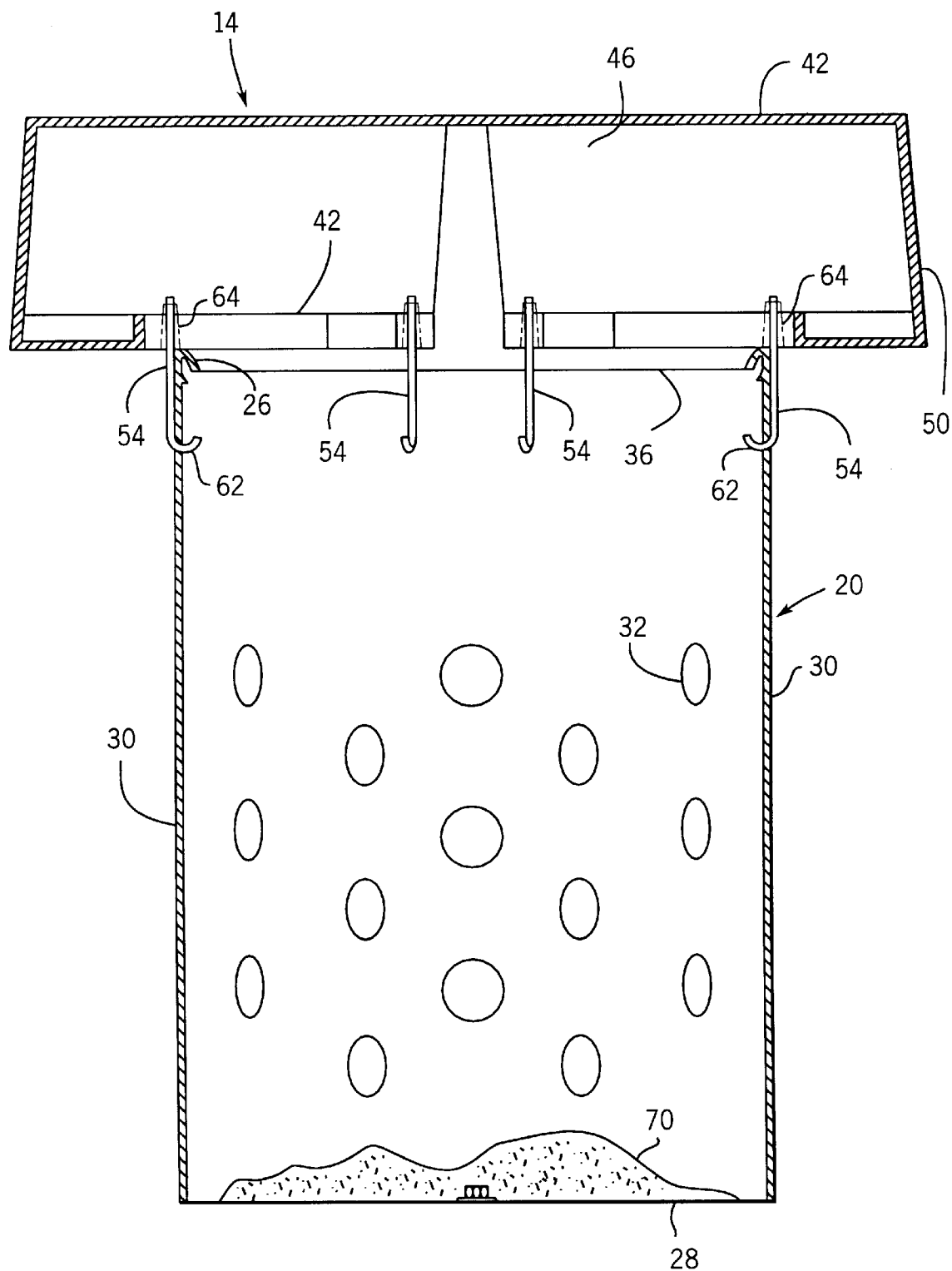
FIG. 4 is a cross-sectional view of the wave suppression member of FIG. 1 taken along lines 4—4.

FIG. 4 is a cross-sectional view of wave suppression member taken along lines 4—4 of FIG. 1. As best shown by FIG. 4, float ring 50 is a hollow annular member encircling top 26 of barrel 20 adjacent to opening 36 so as to buoyantly support opening 36 at the water surface. Although float ring 50 is illustrated as encircling top 26 of barrel 20, float ring 50 may alternatively be encircled by top 26 and be connected to top 26 of barrel 20 by alternative fasteners 54. In the exemplary embodiment illustrated, float ring 50 is integrally formed as part of a unitary body with deflection panels 21a, 21b and flanges 52. Alternatively, wave deflection panels 21a, 21b and flanges 52 may be fixedly coupled to float ring 50 by adhesive, bolts or other coupling means.

Fasteners 54 couple flanges 52 to barrel 20. Fasteners 54 preferably comprise conventional J-bolts. Each J-bolt includes a hook portion 62 which extends through sidewall 30 of barrel 20 and a head 64 captured above flanges 52 to secure barrel 20 to flanges 52 and to float ring 50. As can be appreciated, a variety of mounting mechanisms may be used to couple float ring 50 and flanges 52 to barrel 20.

As further shown by FIG. 4, bottom 28 of barrel 20 is generally imperforate for supporting a ballast 70 within barrel 20 above bottom 28. Ballast 70 preferably comprises rock, sand, cement or any of a variety of dense and heavy materials for weighing down bottom 28 of barrel 20. Ballast 70 helps maintain barrel 20 in a generally vertical orientation despite of the force of waves encountered by wave suppression member 14. Although ballast 70 is illustrated as being a heavy material simply deposited upon bottom 28 within barrel 20, ballast 70 may alternatively constitute any of a variety of conventional weighting mechanisms coupled proximate to bottom 28 inside or outside of barrel 20 so as to weight or anchor barrel 20 and member 14 in a generally vertical orientation while encountering waves. Although wave suppression member 14 is illustrated as including ballast 70, ballast 70 may be omitted depending upon the size of anticipated waves.

Overall, wave suppression system 10 formed by wave suppression members 14 provides an effective breakwater system that is simply and inexpensively manufactured, deployed and maintained. Due to a relatively simple construction, each wave suppression member 14 may be easily manufactured by simply mounting the integrally formed wave deflection panel-flotation member adjacent a top of a preexisting barrel or preexisting cylinder, optionally mounting stabilizing attachment 24 to a bottom of the barrel and perforating the barrel. Because flotation member 22 buoyantly supports top 26 of barrel 20 at the water surface, a substantial portion of barrel 20 extends below the water surface. Because barrel 20 includes perforations allowing water to pass therethrough, barrel 20 contains a large volume of water having a significant mass. The large volume of water contained within barrel 20 naturally and inexpensively provides barrel 20 with a large moment of inertia to resist movement when encountering waves. Because each wave suppression member 14 takes advantage of and utilizes the water surrounding each wave suppression member 14 to resist an oncoming wave, each wave suppression member 14 itself does not require a large mass of dense material to give wave suppression member 14 a large moment of inertia. Ballast 70 and stabilizing attachment 24 provide simple and inexpensive options for further increasing the moment of inertia of each wave suppression member 14. As a result, wave suppression member 14 may be easily and inexpensively manufactured.

To deploy each wave suppression member 14 merely requires releasing or dropping wave suppression member 14 into the waterway or body of water adjacent the marine area or shoreline to be protected. If the anticipated size and energy of the oncoming waves require that wave suppression member 14 have a larger moment of inertia, a ballast such as sand, rock or cement may be easily deposited into the barrel through opening 36 at the deployment site. Because this ballast may be easily added at the deployment site, each wave suppression member 14 itself is lightweight and easy to transport to the deployment site. Moreover, because each wave suppression member 14 is buoyantly supported along the water's surface, wave suppression member 14 is usable in both shallow and deep marine areas.

Moreover, deployment is also simple because wave suppression members 14 forming wave suppression system 10 merely need to be secured to the shoreline or another fixed mounting structure by ropes, cables or other relatively simple coupling mechanisms along or above the water's surface. Because each wave suppression member 14 has a naturally large moment of inertia provided by the water contained within barrel 20, and because the moment of inertia of each wave suppression member 14 may be easily increased by additionally mounting stabilizing attachment 24 or by adding ballast 70, wave suppression members 14 do not need to be fixedly secured to a floor or bed of a waterway or body of water to resist movement when encountering waves. Furthermore, because float ring 50 encircles barrel 20 to support barrel 20 against the force of waves in all directions, because perforations 32 preferably extend through all sides of barrel 20, because wave deflection panels 21a, 21b are perpendicular to one another and because blades 48 of stabilizing attachment 24 are perpendicular to one another, wave suppression members 14 do not need to be fixed in a specific orientation to effectively dissipate oncoming waves.

Once deployed, wave suppression system 10, including wave suppression members 14, effectively dissipates the energy of waves to protect shoreline and marine areas from both natural and manmade waves. Because of each wave suppression member's large moment of inertia, each wave suppression member 14 moves slower than an approaching wave. As a result, the wave swells or crashes over and onto barrel 20 through opening 36. To ensure that the oncoming wave does not simply flow across and over barrel 20, wave deflection panels 21a, 21b deflect the oncoming wave into opening 36. The crashing of the water into barrel 20 causes the wave to lose energy and dissipate. The water crashing through opening 36 diffuses through perforations 32 out barrel 20 to effectively dissipate the energy of the wave and to protect the marine areas from the wave.

Finally, wave suppression members 14 are inexpensive to maintain. Each individual wave suppression member 14 may be easily withdrawn and replaced when worn. Moreover, each wave suppression member 14 is portable and may be easily moved for maintenance or for storage when not being used such as when the water surface freezes in a colder climate.

Although the present invention has been described with reference to preferred embodiments, workers skilled in the art will recognize that changes may be made in form and detail without departing from the spirit and scope of the invention.

What is claimed is:

1. A wave suppression member for suppressing waves along a water surface, the member comprising:
    a hollow cylinder having a top defining an opening, a continuous sidewall extending from the top and having a plurality of perforations therethrough;
    a flotation member coupled to the top of the cylinder for buoyantly supporting the top of the cylinder at the water surface; and
    a bottom surface within the continuous sidewall and within the cylinder opposite to and facing the opening, the bottom surface having a surface area adapted to cooperate with the sidewall so and to be able to support and contain ballast material thereabove within the cylinder and to resist movement of water out of and into the cylinder past the bottom surface such that both upward and downward movement of the cylinder is resisted.

2. The member of claim 1 including:
    a ballast coupled to the cylinder.

3. The member of claim 1 wherein the plurality of perforations extend through the side wall in a direction perpendicular to movement of the waves.

4. The member of claim 1 wherein the plurality of perforations extend through all sides of the cylinder.

5. The member of claim 1 wherein the flotation member includes:
    a float ring surrounding the opening of the top.

6. The member of claim 1 including:
    a first wave deflection panel coupled to the hollow cylinder, the first wave deflection panel having a first vertical surface extending above the opening.

7. The member of claim 6 wherein said at least one deflection panel extends across the top in a direction perpendicular to a movement of the waves.

8. The member of claim 6 including:
    a second wave deflection panel coupled to the cylinder above the opening, the second wave deflection panel having a second vertical surface extending perpendicular to the first vertical surface.

9. The member of claim 1 including:
    a stabilizing attachment coupled to the cylinder for stabilizing the member when encountering the waves.

10. The member of claim 9 wherein the stabilizing attachment includes a disk facing the bottom surface to resist upward and downward vertical movement of the member.

11. The member of claim 10 wherein the stabilizing attachment includes at least one vertical surface obliquely extending from the disk for resisting horizontal movement of the member.

12. The member of claim 9 wherein the stabilizing attachment includes:
    a first vertical member having a first vertical surface; and
    a second vertical member having a second vertical surface extending approximately 90° relative to the first vertical surface.

13. The member of claim 9 wherein the stabilizing attachment includes at least one horizontal surface and at least one vertical surface for resisting vertical and horizontal movement of the member when encountering the waves.

14. A wave suppression member for suppressing waves along a water surface, the member comprising:
    a hollow barrel having a top having an opening and a continuous sidewall extending from the top, wherein the sidewall includes a plurality of perforations therethrough; and
    buoyancy control means for maintaining the top of the hollow barrel at the water surface, the control means including a float coupled to the barrel; and
    a bottom surface within the continuous sidewall and within the barrel opposite to and facing the opening, the bottom surface having a surface area adapted to cooperate with the sidewall so and to be able to support and contain ballast material thereabove within the barrel and to resist movement of water out of and into the barrel past the bottom surface such that both upward and downward movement of the barrel is resisted.

15. The member of claim 14 wherein the plurality of perforations extend through all sides of the hollow barrel.

16. The member of claim 14 wherein the flotation member includes:
    a float ring surrounding the opening of the top.

17. The member of claim 14 including:
    at least one wave deflection panel having a vertical surface extending above the opening for deflecting waves into the barrel.

18. The member of claim 14 including:
a stabilizing attachment suspended from the barrel, the attachment including a disk spaced from and facing the barrel, and a vertical blade obliquely extending from the disk such that the disk and the blade resist horizontal and upward and downward vertical movement of the member when encountering the waves.

19. A wave suppression system for suppressing waves along a water surface, the system comprising:
a plurality of wave suppression members coupled together along the water surface, each member including:
a hollow barrel having a top having an opening, and a continuous sidewall extending between the top and the bottom, wherein the sidewall includes a plurality of perforations therethrough; and a flotation member coupled to the top of the barrel for buoyantly supporting the top of the barrel at the water surface; and
a bottom surface within the continuous sidewall and the barrel opposite to and facing the opening, the bottom surface having a surface area adapted to cooperate with the sidewall so and to be able to support and contain ballast material thereabove within the barrel and to resist movement of water out of and into the cylinder past the bottom surface such that both upward and downward movement of the barrel are resisted.

20. The member of claim 1, wherein the bottom surface is substantially imperforate.

* * * * *